United States Patent [19]
Guerin et al.

[11] Patent Number: 6,036,887
[45] Date of Patent: Mar. 14, 2000

[54] WATER-REDISPERSIBLE GRANULES INCLUDING A LIQUID ACTIVE MATERIAL AND A NON-IONIC ALKOXYL-TYPE SURFACTANT

[75] Inventors: Gilles Guerin, Eaubonne; Mikel Morvan, Courbevoie; Jérôme Bibette, Bordeaux, all of France

[73] Assignee: Rhodia Chimie, Courbevoie, France

[21] Appl. No.: 09/051,738

[22] PCT Filed: Oct. 23, 1996

[86] PCT No.: PCT/FR96/01653

§ 371 Date: Apr. 24, 1998

§ 102(e) Date: Apr. 24, 1998

[87] PCT Pub. No.: WO97/15385

PCT Pub. Date: May 1, 1997

[30] Foreign Application Priority Data

Oct. 25, 1995 [FR] France .................................. 95 12585

[51] Int. Cl.$^7$ ................ A61K 9/16; C09K 3/00; C11D 3/37

[52] U.S. Cl. .......... 252/363.5; 424/501; 426/98; 510/446; 514/952; 516/99; 516/108

[58] Field of Search ............ 516/99, 108; 252/363.5; 424/489, 501; 514/941, 952; 523/340; 526/932; 426/591, 573, 98; 510/446

[56] References Cited

U.S. PATENT DOCUMENTS

| | | | |
|---|---|---|---|
| 2,828,206 | 3/1958 | Rosenberg | 424/498 |
| 3,630,929 | 12/1971 | van Dijk | 252/363.5 X |
| 4,490,407 | 12/1984 | Lafon | 34/5 X |
| 4,548,734 | 10/1985 | Chaux et al. | 252/363.5 X |
| 4,571,422 | 2/1986 | Symes et al. | 252/363.5 X |
| 4,690,775 | 9/1987 | Schott et al. | 516/99 X |
| 4,814,376 | 3/1989 | Tanaka et al. | 524/588 |
| 5,003,060 | 3/1991 | Vinot | 252/363.5 X |

FOREIGN PATENT DOCUMENTS

WO94/09058  4/1994  WIPO.

OTHER PUBLICATIONS

Database WPI Derwent Publications, Ltd., London, GB; AN 81–50852d XP 002008139 & JP,A,56061 497 (Nippon Surfactant KK), May 26, 1981 "Pulverise Oil Substance Forming Medium Oil Type Emulsion Mix Polyhydric Alcohol Hydrophilic Sugar Fatty Acid Ester".

Database WPI Derwent Publications, Ltd., London, GB; AN 93–330525 XP 002008140 & JP,A,05 236,886 (Lion Corp), Sep. 17, 1993 "Powder Emulsion Composition Food Comprise Spray Dry Mixture Saturate Fatty Acid Mono Glyceride Obtain Heat Resistance Fix Lipase Succinic Acid Ester Saturate Fatty Acid Monoglyceride".

*Primary Examiner*—Richard D. Lovering
*Attorney, Agent, or Firm*—Jean-Louis Seugnet

[57] ABSTRACT

Water-redispersible granules including at least one active material in the form of a hydrophobic liquid, at least one non-ionic surfactant selected from polyoxyalkylene derivatives, and at least one water-soluble compound selected from polyelectrolytes belonging to the weak polyacid family are disclosed. A method for preparing such granules by preparing an aqueous emulsion of at least one active material, at least one non-ionic surfactant and at least one water-soluble compound, and drying the resulting emulsion, is also disclosed.

12 Claims, No Drawings

WATER-REDISPERSIBLE GRANULES INCLUDING A LIQUID ACTIVE MATERIAL AND A NON-IONIC ALKOXYL-TYPE SURFACTANT

This application is a 371 of PCT/FR96/01653 filed Oct. 23, 1996.

The present invention relates to water-redispersible granules comprising an active ingredient in liquid form, a process for the preparation thereof and the use thereof.

In some industries, such as the food, cosmetics or paint industries, formulations are prepared from active ingredients in the form of a hydrophobic liquid. One formulation possibility is to prepare oil-in-water emulsions of such ingredients.

However, such emulsions cause stability problems on storage. The phases of the emulsion constituents are seen to separate to a greater or lesser extent. Further, there may be problems with deactivation of the active ingredient to contend with, the active ingredient possibly degrading by hydrolysis during storage.

Finally, the fact that in order to be readily manipulatable and pumpable, such formulations must contain relatively low quantities of active ingredient and a large amount of water cannot be ignored.

The present invention aims to provide an original alternative to the problems mentioned above in that the formulations proposed are powders containing high concentrations of active ingredient initially in the form of a hydrophobic liquid.

The invention thus provides water-redispersible granules comprising:
at least one active ingredient in the form of a hydrophobic liquid;
at least one non ionic surfactant selected from polyoxyalkylene derivatives;
at least one hydrosoluble compound selected from polyelectrolytes from the weak polyacid family.

The invention also provides a process for preparing such granules consisting of carrying out the following steps:
preparing an emulsion in water of at least one active ingredient, at least one non ionic surfactant, and at least one hydrosoluble compound;
drying the emulsion obtained.

The granules of the present invention have the following advantages.

Firstly, their conformation can avoid all of the problems of using emulsions. Thus problems of instability on storage are avoided, such as creaming, flocculation, ageing and coalescence. These different phenomena have been described in the "ENCYCLOPEDIA OF EMULSIONS TECHNOLOGY", volume 1, by Paul BECHER published by MARCEL DEKKER INC., 1983.

A further advantage of the present invention is that the concentrations of active ingredients can be very high compared with emulsions. As a result, during use of these granules, a smaller quantity of granules will suffice.

Further, the conformation of the invention can overcome the problem of deactivation of the active ingredient when it is sensitive to hydrolysis.

The present invention can also provide a pre-formulation in the form of granules which are thus easier to use than emulsions, for example in the case where the pre-formulation is added to a powder formulation.

Further, the granules of the invention, prepared from an emulsion, have the advantage of redispersing spontaneously in water, to produce again an emulsion with a granulometry close to that of the initial emulsion.

Finally, the present invention provides a solution to the problems of liquid product conformations which are normally formulated by absorption on a support. The concentration of active ingredient in such formulations is often low and there may be phase separation between the support and the active ingredient by migration of the active ingredient during storage.

Further advantages and characteristics will become more clear from the following description and examples.

As indicated above, the granules of the invention comprise at least one active ingredient in the form of a hydrophobic liquid.

All active ingredients are suitable provided that at ambient temperature they are in the form of a liquid which is non miscible in or very slightly miscible with water or are dissolved in an organic solvent.

The term "slightly miscible" means active ingredients with a solubility in water not exceeding 10% by weight.

The term "active ingredient" means either pure active ingredient or active ingredient dissolved in a solvent, or a solvent.

Examples of active ingredients in the food industry are mono-, di- and tri-glycerides, essential oils, flavourings, and colorants.

Examples of active ingredients in the cosmetics industry are silicone oils, for example from the dimethicone family.

Examples of active ingredients suitable for implementing the invention in the paint industry are alkyl resins, epoxy resins, and block or non blocked isocyanates.

In the paper industry, examples are sizing resins and water repelling resins such as alkylketene dimer (AKD) or alkenyl succinic anhydride (ASA).

In the detergent industry, silicone antifoaming agents can be mentioned as active ingredients.

It is also possible to use active ingredients such as lubricants for working or deforming materials.

When the active ingredient is a solvent or a mixture of solvents, solvents are used which are non miscible in or slightly miscible with water, as defined above. Solvents which can be used are those used for cleaning or stripping, such as aromatic petroleum cuts, terpene compounds such as D-limonene, or L-limonene, also solvents such as Solvesso®. Aliphatic esters such as methyl esters of a mixture of acetic, succinic and glutaric acids (the acid mixture is a by-product of Nylon synthesis), oils such as vaseline oil, and chlorinated solvents are also suitable as solvents.

This list is, of course, given by way of indication only and is not exhaustive.

The active ingredients can be used as they are or in the presence of an organic solvent. More particularly, this solvent is selected from products which are insoluble in or slightly miscible with water.

Examples are mineral oils, mono-, di- and tri-glycerides of saturated or unsaturated fatty acids; they may be natural or synthetic triglycerides, aromatic petroleum cuts, terpene compounds (D-limonene, L-limonene), aliphatic esters or chlorinated solvents.

The granules of the invention also comprise at least one non ionic surfactant selected from polyoxyalkylene derivatives.

More particularly, the following can be cited:
ethoxylated or ethoxy-propoxylated fatty alcohols;
ethoxylated or ethoxy-propoxylated triglycerides;
ethoxylated or ethoxy-propoxylated fatty acids;
ethoxylated or ethoxy-propoxylated sorbitan esters;
ethoxylated or ethoxy-propoxylated fatty amines;

ethoxylated or ethoxy-propoxylated di(1-phenylethyl) phenols;
ethoxylated or ethoxy-propoxylated tri(1-phenylethyl) phenols;
ethoxylated or ethoxy-propoxylated alkyl phenols.

The number of oxyethylene (OE) and/or oxypropylene (OP) units in these non ionic surfactants is normally between 2 and 100 depending on the desired HLB (hydrophile/lipophile balance). More particularly, the number of OE and/or OP units is between 2 and 50. Preferably, the number of OE and/or OP units is between 10 and 50.

The ethoxylated or ethoxy-propoxylated fatty alcohols generally comprise 6 to 22 carbon atoms, OE and OP units being excluded from these numbers. These units are preferably ethoxylated units.

The ethoxylated or ethoxy-propoxylated triglycerides can be triglycerides of vegetable or animal origin (such as lard, tallow, peanut oil, butter oil, cottonseed oil, linseed oil, olive oil, fish oil, palm oil, grapeseed oil, soya oil, castor oil, rapeseed oil, copra oil, or coconut oil, and are preferably ethoxylated.

The ethoxylated or ethoxy-propoxylated fatty acids are esters of fatty acids (such as oleic acid, stearic acid), and are preferably ethoxylated.

The ethoxylated or ethoxy-propoxylated esters are cyclised sorbitol esters of fatty acids containing 10 to 20 carbon atoms such as lauric acid, stearic acid or oleic acid, and are preferably ethoxylated.

The term "ethoxylated triglyceride" used in the present invention covers products obtained by ethoxylation of a triglyceride by ethylene oxide and those obtained by transesterification of a triglyceride by a polyethylene glycol.

Similarly, the term "ethoxylated fatty acid" includes both products obtained by ethoxylation of a fatty acid by ethylene oxide and those obtained by transesterification of a fatty acid by a polyethylene glycol.

The ethoxylated or ethoxy-propoxylated fatty amines generally contain 10 to 22 carbon atoms, the OE and OP units being excluded from these numbers, and are preferably ethoxylated.

The ethoxylated or ethoxy-propoxylated alkylphenols are generally 1 or 2 linear or branched alkyl groups containing 4 to 12 carbon atoms. Examples are octyl, nonyl and dodecyl groups.

Examples of non ionic surfactants of ethoxylated or ethoxy-propoxylated alkylphenols, ethoxylated di(1-phenylethyl) phenols and ethoxylated or ethoxy-propoxylated tri(1-phenylethyl) phenols are di(1-phenylethyl)phenol ethoxylated with 5 OE units, di(1-phenylethyl)phenol ethoxylated with 10 OE units, tri(1-phenylethyl)phenol ethoxylated with 16 OE units, tri(1-phenylethyl)phenol ethoxylated with 20 OE units, tri(1-phenylethyl)phenol ethoxylated with 25 OE units, tri(1-phenylethyl)phenol ethoxylated with 40 OE units, tri(1-phenylethyl) phenols ethoxy-propoxylated with 25 OE+OP units, nonylphenol ethoxylated with 2 OE units, nonylphenol ethoxylated with 4 OE units, nonylphenol ethoxylated with 6 OE units, nonylphenol ethoxylated with 9 OE units, nonylphenol ethoxy-propoxylated with 25 OE+OP units, nonylphenol ethoxy-propoxylated with 30 OE+OP units, nonylphenol ethoxy-propoxylated with 40 OE+OP units, nonylphenol ethoxy-propoxylated with 55 OE−OP units, and nonylphenol ethoxy-propoxylated with 80 OE+OP units.

The redispersible granules of the invention also comprise at least one hydrosoluble compound selected from polyelectrolytes from the weak polyacid family. More particularly, the compound is a solid.

In a particular embodiment of the invention, this hydrosoluble compound is selected from organic polyelectrolytes from polymerising monomers with the following general formula:

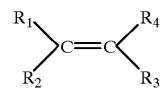

in which formula $R_1$, which may be identical or different, represents H, $CH_3$, $CO_2H$, $(CH_2)_nCO_2H$ where n=0 to 4.

Non limiting examples are acrylic acid, methacrylic acid, maleic acid, fumaric acid, itaconic acid, and crotonic acid.

Copolymers obtained from monomers with the above general formula and those obtained using these monomers and other monomers, in particular vinyl derivatives such as vinyl alcohols and vinyl amides such as vinylpyrrolidinone are also suitable. Copolymers obtained from alkyl vinyl ether and maleic acid and those obtained from vinyl styrene and maleic acid, as described in the KIRK-OTHMER encyclopaedia entitled "ENCYCLOPEDIA OF CHEMICAL TECHNOLOGY" Volume 18—$3^{rd}$ edition, Wiley Interscience publication, 1982, can also be cited.

Peptide polymers derived from polycondensation of amino acids, in particular aspartic acid and glutamic acid, or precursors of diaminoacids, are also suitable. These polymers can also be homopolymer hydrolysates derived from aspartic acid or glutamic acid and copolymers derived from aspartic acid and glutamic acid in any proportions, or copolymers derived from aspartic and/or glutamic acid and other amino acids. Examples of copolymerisable amino acids are glycine, alanine, leucine, isoleucine, phenylalanine, methionine, histidine, proline, lysine, serine, threonine, cysteine . . .

Preferred polyelectrolytes have a low degree of polymerisation.

More particularly, the mass average molecular mass of the polyelectrolytes is below 20000 g/mole. It is preferably in the range 1000 to 5000 g/mole.

Different types of hydrosoluble compounds can, of course, be used in combination.

The redispersible granules of the present invention can also contain a supplementary ionic surfactant.

More particularly, the supplemental ionic surfactants can be amphoteric surfactants such as alkyl betaines, alkyldimethyl betaines, alkylamidopropyl betaines, alkylamidopropyldimethyl betaines, alkyltrimethyl sulphobetaines, imidazoline derivatives such as alkylamphoacetates, alkylamphodiacetates, alkylamphopropionates, alkylamphodipropionates, alkylsultains or alkylamidopropyl hydroxysultains, the condensation products of fatty acids and protein hydrolysates, amphoteric derivatives of alkylpolyamines such as Amphionic XL® sold by Rhone-Poulenc, and Ampholac 7T/X® and Ampholac 7C/X® sold by Berol Nobel.

The granules of the invention can also comprise at least one supplemental anionic surfactant.

To this end, hydrosoluble salts of the following can be used: alkylsulphates, alkylethersulphates, alkylisethionates and alkyltaurates or their salts, alkylcarboxylates, alkylsulphosuccinates or alkylsuccinamates, alkylsarcosinates, alkylated derivatives of protein hydrolysates, acylaspartates, and alkyl and/or alkylether and/or alkylarylether ester phosphates.

The cation is generally an alkaline or alkaline-earth metals, such as sodium, potassium, lithium, magnesium, or an ammonium group $NR_4^+$ where R, which can be identical or different, represents an alkyl radical which may or may not be substituted by an oxygen atom or nitrogen.

It is possible to add any conventional additive to the redispersible granules of the invention, depending on the field of application of the latter.

As indicated above, the redispersible granules of the invention have high quantities of active ingredient.

Thus the quantity of active ingredient is advantageously in the range 40 to 90 parts by weight in the granule. In a particular implementation of the invention, the quantity of active ingredient is over 50 parts by weight. This content is preferably at least 70 parts by weight.

The quantity of non ionic surfactant is between 1 and 20 parts by weight in the granule. This quantity is preferably in the range 2 to 10 parts by weight.

The quantity of hydrosoluble compound is between 7 and 50 parts by weight in the granule. In a particular variation, this quantity is in the range 8 to 25 parts by weight.

The ratio of the concentrations of non ionic surfactant to the hydrosoluble compound is in the range 30/70 to 10/90 by weight.

When the redispersible granules of the invention comprise at least one supplemental surfactant, the ratio of concentrations between the non ionic surfactant and the supplemental surfactant is in the range 5 to 10.

A process for preparing the redispersible granules will now be described.

As indicated above, the process consists, in a first step, of preparing an emulsion in water of at least one active ingredient, at least one non ionic surfactant and at least one hydrosoluble compound.

The emulsion can also comprise at least one supplemental surfactant if such a compound is used.

Clearly, when conventional additives are used, they can be added during formation of the emulsion.

Any of the emulsion forming methods known to the skilled person and described in the "ENCYCLOPEDIA OF EMULSIONS TECHNOLOGY", volumes 1 to 3, by Paul BECHER published by MARCEL DEKKER INC., 1983, can be used.

Thus a direct phase emulsification method is suitable for preparing the granules of the invention. Briefly, this method consists of preparing a mixture containing water and the surfactant(s), including the hydrosoluble compound, then introducing the active ingredient in liquid form, with stirring.

A further suitable method is reverse phase emulsification. This involves mixing the active ingredient with a non ionic surfactant and introducing, drop by drop and with stirring, water which can contain the other constituents such as the hydrosoluble solid, for example. Once the quantity of water introduced passes beyond a certain point, the emulsion reverses. Thus a direct oil-in-water emulsion is obtained. The emulsion obtained is then diluted in water to obtain the appropriate volume fraction of dispersed phase.

Finally, the emulsion can be prepared using colloidal mills such as the MANTON GAULIN and MICROFLUIDIZER (MICROFLUIDICS).

The average granulometry of the emulsion is generally in the range 0.1 to 10 micrometers, preferably 0.2 to 5 micrometers.

In a preferred variation of the invention, a mixture comprising water and the hydrosoluble compound (pre-emulsion) is first prepared.

Emulsification can be carried out at a temperature close to ambient temperature, although lower temperatures or higher temperatures can be envisaged.

The quantity of dry matter in the emulsion is generally in the range 10% to 70% by weight, preferably in the range 40% to 60% by weight.

The respective contents of the various constituents are selected so that the dry granules have the composition defined above.

The second step of the preparation process of the invention consists of drying the emulsion formed to obtain granules.

The method used to eliminate the water from the emulsion and obtain granules can be carried out using any means known to the skilled person. However, in a particular implementation of the invention, a rapid drying method is used for the emulsion.

A suitable technique is freeze drying, which corresponds to a freezing step followed by a sublimation step, or by spray drying.

These drying modes, in particular the latter, are particularly suitable as they can preserve the emulsion as it stands and produce granules directly.

Spray drying can be carried out normally, in any known apparatus such as a spray tower which combines spraying carried out via a nozzle or turbine with a stream of hot gas.

The hot gas inlet temperature (in general air) of the hot gas at the head of the column is preferably in the range 100° C. to 115° C. and the outlet temperature is preferably in the range 55° C. to 65° C.

It should be noted that additives such as anti-clogging agents can be incorporated into the granules at the second drying step. It is recommended that a filler be used, selected from calcium carbonate, barium sulphate, kaolin, silica, bentonite, titanium oxide, talc, hydrated alumina and calcium sulphoaluminate.

The following non limiting examples will now be described.

EXAMPLE 1

An emulsion was prepared with the following composition:

| Composition | % by weight |
| --- | --- |
| Vaseline oil | 40 |
| Nonyl phenol ethoxylated with 10 OE units* | 1 |
| Polyacrylic acid** (MW = 2000) | 9 |
| Water | 50 |

*Ethoxylated nonylphenol is sold by Rhone-Poulenc under the trade name Soprophor ® BC10.
**Polyacrylic acid is sold by Aldrich.

A pre-emulsion was formed using an ULTRA-TURRAX® (IKA) by introducing the vaseline oil into water containing the surfactant and the polyacid. The emulsion was then introduced into a NfICROFLUIDIZER-M110T® (MICROFLUIDICS) colloidal mill.

The average size of the emulsion, measured using a SYMPATEC® laser granulometer, was 0.5 micrometers.

The resulting emulsion was dried in a BUCHI® laboratory spray drier with a gas inlet temperature of 110° C.

Granules were obtained with 80% by weight of oil.

Bringing the granules into contact with water caused them to disperse spontaneously and form an emulsion which after microscopic examination, had a granulometry which was close to that of the starting emulsion.

EXAMPLE 2

An emulsion was prepared with the following composition:

| Composition | % by weight |
| --- | --- |
| Silicone oil 47V300 | 40 |
| Nonyl phenol ethoxylated with 10 OE units* | 1 |
| Polyacrylic acid** (MW = 2000) | 9 |
| Water | 50 |

*Ethoxylated nonylphenol is sold by Rhone-Poulenc under the trade name Soprophor ® BC10.
**Polyacrylic acid is sold by Aldrich.

A pre-emulsion was formed using an ULTRA-TURRAX® by introducing the vaseline oil into water containing the surfactant and the polyacid. The emulsion was then introduced into a MICROFLUIDIZER-M110T® colloidal mill.

The resulting emulsion was dried in a BUCHI® laboratory spray drier with a gas inlet temperature of 110° C.

Granules were obtained with 80% by weight of oil.

Bringing the granules into contact with water caused them to disperse spontaneously and form an emulsion which after microscopic examination, had a granulometry which was close to that of the starting emulsion.

EXAMPLE 3

An emulsion was prepared with the following composition:

| Composition | % by weight |
| --- | --- |
| Vaseline oil | 40 |
| Nonyl phenol ethoxylated with 10 OE units* | 1 |
| Polyacrylic acid** (MW = 5000) | 18 |
| Water | 41 |

*Ethoxylated nonylphenol is sold by Rhone-Poulenc under the trade name Soprophor ® BC10.
**Polyacrylic acid is sold by Aldrich in 50% by weight solution in water.

A pre-emulsion was formed using an ULTRA-TURRAX® by introducing the vaseline oil into water containing the surfactant and the polyacid. The emulsion was then introduced into a MICROFLUIDIZER-M110T® colloidal mill.

The resulting emulsion was dried in a BUCHI® laboratory spray drier with a gas inlet temperature of 110° C.

Granules were obtained with 80% by weight of oil. is Bringing the granules into contact with water caused them to disperse spontaneously and form an emulsion which after microscopic examination, had a granulometry which was close to that of the starting emulsion.

What is claimed is:

1. A water-redispersible granule, comprising:
   at least one active ingredient in the form of a hydrophobic liquid;
   at least one non ionic surfactant selected from the group consisting of polyoxyalkylene compounds,
   at least one supplemental ionic surfactant, and
   at least one hydrosoluble compound surfactant selected from the group consisting of polyelectrolytes from the weak polyacid family.

2. A granule according to claim 1, wherein the non ionic surfactant is:
   an ethoxylated fatty alcohol; an ethoxy-propoxylated fatty alcohol;
   an ethoxylated triglyceride; an ethoxy-propoxylated triglyceride;
   an ethoxylated fatty acid; an ethoxy-propoxylated fatty acid;
   an ethoxylated sorbitan ester; an ethoxy-propoxylated sorbitan ester;
   an ethoxylated fatty amine; an ethoxy-propoxylated fatty amine;
   an ethoxylated di(1-phenylethyl) phenol; an ethoxy-propoxylated di(1-phenylethyl) phenol;
   an ethoxylated tri(1-phenylethyl) phenol; an ethoxy-propoxylated tri(1-phenylethyl) phenol;
   an ethoxylated alkyl phenol; or an ethoxy-propoxylated alkyl phenol.

3. A granule according to claim 1, wherein the hydrosoluble compound is an organic polyelectrolyte prepared from polymerising a monomer with the following general formula:

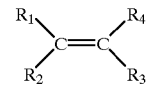

wherein $R_1$, $R_2$, $R_3$, and $R_4$, which may be identical or different, represent H, $CH_3$, $CO_2H$, $(CH_2)_n CO_2 H$ where n=0 to 4.

4. A granule according to claim 3, wherein the polyelectrolyte has a mass average molecular mass of less than 20000 g/mole.

5. A granule according to claim 1, wherein the quantity of active ingredient is in the range 40 to 90 parts by weight in the granule.

6. A granule according to claim 1, wherein the quantity of non ionic surfactant is between 1 and 20 parts by weight in the granule.

7. A granule according to claim 1, wherein the quantity of hydrosoluble compound is between 7 and 50 parts by weight in the granule.

8. A granule according to claim 1, wherein the ratio of the concentrations of the non ionic surfactant to the supplemental ionic surfactants is in the range 5 to 10 by weight.

9. A granule according to claim 1, wherein the ratio of the concentrations of the non ionic surfactant to the hydrosoluble compound is in the range 30/70 and 10/90.

10. A process for the preparation of a redispersible granule in water as defined in claim 1, comprising the steps of:
    1) preparing an emulsion in water of at least one active ingredient, at least one non ionic surfactant, at least one supplemental ionic surfactant, and at least one hydrosoluble compound; and
    2) drying the emulsion obtained.

11. A process according to claim 10, wherein the emulsion has 10% to 70% by weight of dry matter.

12. A process according to claim 10, wherein drying is by spray drying.

* * * * *